Ｕnited States Patent Office 3,409,242
Patented Nov. 5, 1968

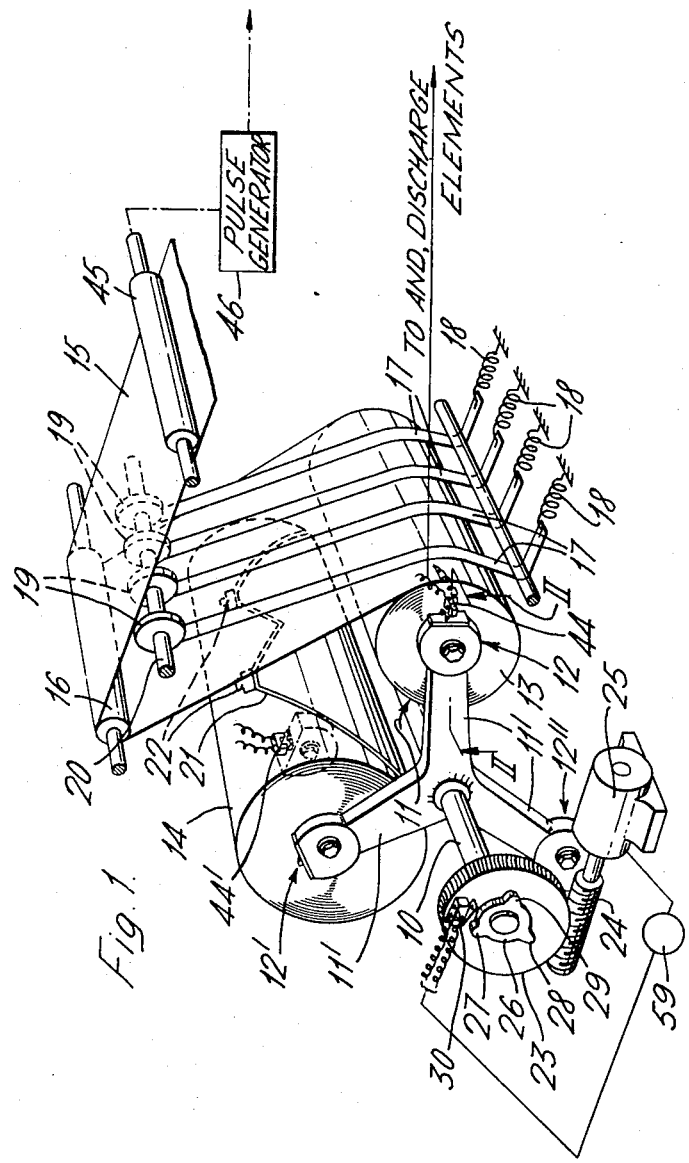

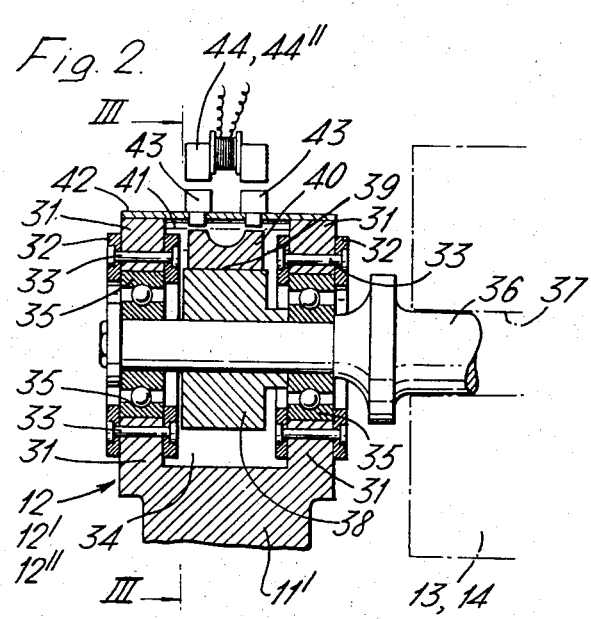
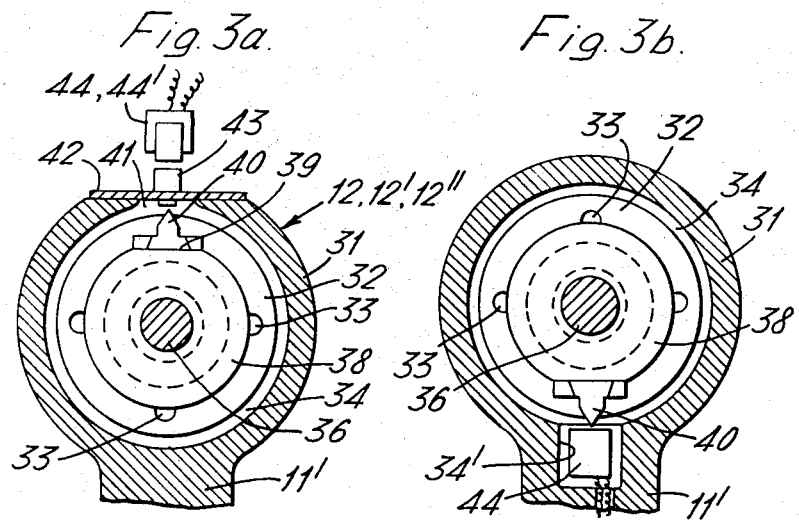

3,409,242
APPARATUS FOR DETECTING THE DIAMETER
OF A ROLLED SHEET
Taneji Kishioka, Toyonaka, Osaka, Japan, assignor to Hamada Printing Press Mfg. Co., Ltd., Osaka, Japan, a corporation of Japan
Filed Oct. 7, 1966, Ser. No. 585,067
Claims priority, application Japan, Nov. 11, 1965, 40/69,340
8 Claims. (Cl. 242—58.1)

ABSTRACT OF THE DISCLOSURE

An apparatus for detecting the changing diameter of a rolled sheet being wound or unwound including a pair of magnetically permeable proximity detectors fixed relative to a projecting magnet member on the roll shaft to effect check pulses upon shaft rotation, the time interval between pulses determining the increase in charged voltage of a condenser, the condenser voltage originating from the output of a pulse generator via a stepped wave-producing element, the system actuating a relay through AND and MEMORY elements to change rolls whenever the condenser voltage drops below a predetermined references voltage.

---

This invention relates to an apparatus for detecting the diameter of a rolled sheet of paper, cloth, or the like as it is being wound or unwound.

In winding a continuous sheet of paper, cloth, metal, synthetic film or the like into a roll or drawing it out of the roll, it is necessary to detect the diameter of the roll in order to have an accurate information about the quantity that has been wound or paid out, or to know the time when the wound roll is to be removed from the machine or a new roll has to be supplied.

The primary object of the invention is to provide a system for use in combination with such winding or unwinding apparatus, which is capable of detecting the varying diameter of a rolled sheet of a material as the sheet is being wound into the roll or paid out therefrom.

Another object of the invention is to provide such a system as aforesaid which is simple in construction, and reliable and accurate in operation.

In accordance with the invention, there is provided a system which comprises a projecting member rigidly mounted or formed on a rotatable shaft adapted to support a rolled sheet of a material for rotation therewith, and a promixity detector disposed relative to the shaft so that every time the projecting member, while being rotated on the shaft, passes by the detector, a pulse is produced by the detector. These pulses may be referred to as check pulses. Another pulse generating means is also provided, which produces pulses, one pulse for every predetermined length of the running sheet as it is being wound into a roll or unwound therefrom. These pulses may be referred to as reference or measuring pulses. The reference pulses are applied to a stepped-wave producing element, the output of which is applied to a condenser so as to raise the charged voltage step by step. The voltage level attained by the condenser during the time interval between each succeeding pair of check pulses is compared with a reference voltage.

In case the system is applied to a winding apparatus, provided that the length of sheet being wound per unit time is constant, the rotational speed of the shaft supporting the rolled sheet decreases as the roll increases in diameter. This causes the interval between each succeeding pair of check pulses to become longer and longer so as to accommodate more and more measuring pulses until the charged voltage of the condenser exceeds the reference voltage level. On the contrary, if the system is applied to an apparatus in which the sheet is continuously drawn out of the rolled sheet, the rotational speed of the supporting shaft increases as the rolled sheet decreases in diameter. As a result, the interval between each succeeding pair of check pulses becomes shorter and shorter, thereby accommodating fewer and fewer measuring pulses, until the charged voltage of the condenser drops below the reference voltage level.

In either case, when the charged voltage has become substantially equal to the reference voltage level, a signal is produced, which can be utilized to recognize that the rolled sheet has exceeded or run short of a predetermined diameter.

The invention and its above-stated and other objects, features and advantages will become more apparent from the following detailed description of a preferred embodiment thereof with reference to the accompanying drawings, wherein:

FIG. 1 is a perspective view of the paper feeder of an automatic rotary press to which the invention is applied;

FIG. 2 is an enlarged sectional view taken along line II—II of FIG. 1;

FIG. 3a is a sectional view taken along line III—III of FIG. 2;

FIG. 3b is a view similar to FIG. 3a but showing a modified form;

Figure 4:
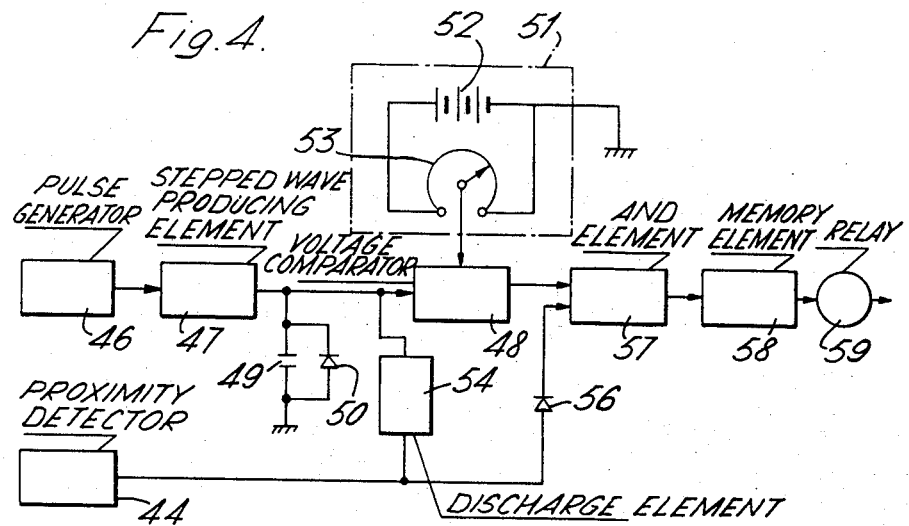
FIG. 4 is a schematic block diagram of the electrical control circuit of the invention.

Referring now in detail to the drawings, first to FIG. 1, there is shown a shaft 10 suitably journaled and provided with a pair of spiders 11 having three arms 11' and rigidly secured thereto in an axially spaced apart relation, although one of the spiders is not shown in the drawing. The three arms 11' are provided at their respective outer ends with a head generally designated at 12, 12' and 12". The spiders rotatably support three rolls of paper, two of which are illustrated at 13 and 14. A continuous sheet of paper 15 is shown being paid out of the roll 13 so as to pass around a guide roller 16 to be delivered onto the printing section of the press (not shown). A plurality of flexible bands 17 have their respective lower ends pulled by springs 18 and their respective upper ends secured to pulleys 19 mounted rigidly on a common shaft 20. The shaft 20 is driven by a torque motor (not shown) so that the bands 17 are always pressed against the reverse side of the running sheet of paper 15 so as to keep the sheet in a suitably tensioned condition. The other rolled sheet of paper 14 is provided for use when the roll 13 has been consumed. The rolled sheet of paper 14 has a W-shaped outer end hemmed with a tape 21 having tabs 22, both coated with a particular kind of adhesive and attached to the outer surface of the roll.

A worm wheel 23 is rigidly mounted on the shaft 10 and engages with a worm gear 24 mounted on the output shaft of a motor 25 for rotation therewith. It will be seen that upon rotation of the motor 25, the shaft 10 is rotated to remove the roll 13 and at the same time bring the new roll 14 for a predetermined angle to where the roll 14 contacts the running paper 15 as will be described later. To stop the motor then, the shaft 10 is provided with a disc 26 having three cam projections 27, 28, 29 equidistantly spaced apart on the periphery of the disc 26; and a limit switch 30 inserted in the energizing circuit of the motor 25 is provided so as to be acted on by the cam projections to open the circuit to stop the motor.

When the spiders have been turned to bring the new roll 14 into contact with the running sheet of paper 15 still being drawn out from the roll 13, the roll 14 is frictionally rotated. When the circumferential speed of the roll 14 becomes substantially equal to that of the running sheet of paper from the roll 13, a sprayer (not shown) jets a suitable solvent to the cylindrical surface of the roll 14 to activate the adhesive on the tape 21 and tabs 22, whereupon it is adhered to the running sheet of paper so that the sheet of paper is is now withdrawn out of the new roll 14. At the same time, the old sheet of paper 15 is cut from the roll 13 by a suitable cutter (not shown) provided for the purpose.

Referring to FIGS. 2 and 3a which show the details of the heads 12, 12', 12", which are of the same construction, each spider arm 11' is provided at its outer end with a hollow, relatively short cylindrical wall 31, the opposite open ends of which are closed by end plates 32 secured to the wall 31 by bolts 33 so as to define a chamber 34. Just inside the end plates there are provided a pair of bearings 35, which receive therein a shaft 36 adapted to be inserted into a central through bore 37 of the roll of paper 13 or 14 to carry the same for simultaneous rotation therewith.

Inside the chamber 34, a cylindrical member 38 is rigidly mounted on the shaft 36 for simultaneous rotation therewith. The member 38 has a portion of its periphery cut off to form a flat face 39 upon which is fixed a permanent magnet 40 of a U-shape, as viewed laterally of the shaft 36, having two poles. The cylindrical wall of the head 12 is formed at its outer or upper side with an opening 41 closed by a plate 42 of non-magnetic material. The plate has a pair of magnetically permeable pieces 43 having their respective inner end faces momentarily facing across a narrow air gap the outer end faces of the two legs of the permanent magnet 40 as the latter is rotated on the shaft 36 within the chamber 34. A pair of proximity detectors 44 and 44' are suitably mounted on the frame of the machine (not shown) at such positions that the detector 44 faces the magnetically permeable pieces 43 on the head 12 when the head is positioned for the rolled sheet 13 to be feeding paper and that the detector 44' faces the magnetically permeable pieces 43 on the head 12' when the head has been brought into the position, as shown in dash-and-dot lines in FIG. 1, where the new roll 14 is frictionally rotated by the running sheet of paper 15.

As the magnet 40 is rotated upon rotation of the shaft 36, to pass by the permeable members 43, the flux cuts the coil of the detector 44 (or 44'). The arrangement is such that one positive and one negative pulses are produced for every one revolution of the shaft. By counting the number of pulses, therefore, it is possible to know the number of revolutions of the shaft and consequently the rolled sheet of paper.

A modified form of the head is shown in FIG. 3b, wherein the cylindrical wall 31 has no opening such as at 41 in FIG. 3a, and the proximity detector 44 is put in a recess 34' formed in the outer end of the spider arm 11'. The output of the detector may be taken out through a slip ring (not shown) connected to the lead lines of the detector. The advantage of this arrangement is that no consideration need be given to the relative position of the head and the detector, and that the head can be stopped at any desired position.

In accordance with the invention, the member 40 need not necessarily be a magnet or of a permeable material. Nor is the detector 44 limited to the type illustrated and described. The only requirement is that a projection is integrally or otherwise formed on the shaft 36 for simultaneous rotation therewith and a suitable type of detector detects nearby passage of the projection and produces a corresponding signal.

Figure 5:
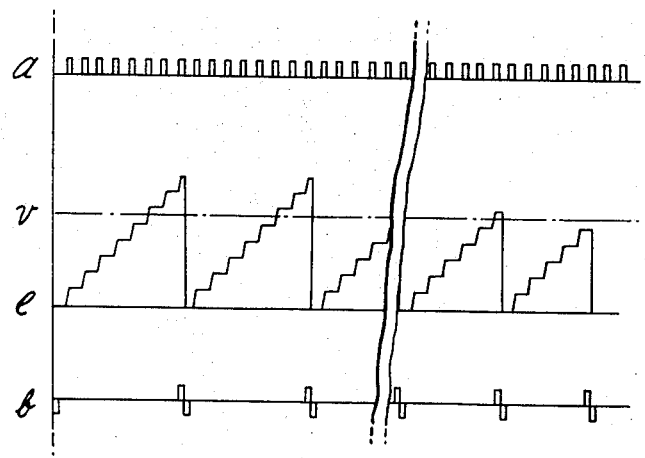
FIG. 5 schematically shows the wave forms of different pulses, illustrating the principle of operation of the control circuit.

A touch roller 45 bears on the running sheet of paper 15 with a suitable pressure so as to be frictionally rotated thereby. A pulse generator 46 is connected to the shaft of this roller 45 and is adapted to produce one pulse for every one unit length of the running paper. Consequently, the length of the paper being paid out is represented by the number of pulses produced by the pulse generator 46. Referring to FIGS. 4 and 5, the output pulses $a$ from the generator 46 are applied to a stepped-wave producing element 47, the output of which is in turn applied to a voltage comparator 48. The element 47 is designed to produce output pulses of a predetermined constant width regardless of variation of the width of the input pulses. A parallel combination of a condenser 49 and a diode 50 is connected between the output of the element 47 and ground. To the voltage comparator there is connected a reference voltage source 51 which comprises a parallel combination of a direct current source 52 and a variable resistor 53. By moving the slider of the resistor into a suitable position, it is possible to impress a desired reference voltage $v$ (see FIG. 5) on the comparator 48.

The proximity detector 44 is connected through a discharge element 54 to the output of the stepped-wave producing element 47 on one hand and through a diode 56 to one of the two inputs of an AND element 57 on the other hand. To the other input of the AND element is connected the output of the voltage comparator 48. The output of the AND element is connected to a MEMORY element 58, the output of which actuates a relay 59.

The reference pulses from the pulse generator 46 are applied to the stepped-wave producing element 47 to increase its output voltage step by step, with which the condenser 49 is charged. The proximity detector 44 produces check pulses $b$, one positive and one negative pulse for every one revolution of the rolled sheet of paper 13. The positive pulse is applied through the diode 56 to the AND element 57, while the negative pulse is applied through the discharge element 54 to the condenser 49, whereupon it is discharged through the element 54 to zero voltage so as to begin being charged again with the output from the element 47. If the diameter of the rolled sheet 13 is yet relatively large and the rotational speed thereof is low, the time interval between the check pulses is relatively long enough to allow a greater number of reference pulses to be charged into the condenser 49 during the time interval, and consequently the charged voltage of the condenser to be applied to the voltage comparator 48 is higher than the reference voltage. Under this condition, the comparator 48 does not produce any output, so that the AND element 57 does not produce any output, either. However, as the rolled sheet 13 is consumed, with resulting decrease in the roll diameter and increase in the rotational speed thereof, the time interval between each succeeding pairs of check pulses becomes shorter, so that the number of reference pulses produced during the interval decreases, with resulting gradual decrease in the charged voltage of the condenser.

The charged voltage $e$ of the condenser is applied to the comparator 48 to which the reference voltage $v$ is also applied. The comparator is so arranged that so long as the voltage $e$ is higher than the voltage $v$, it does not produce any output, while when the former voltage decreases below the latter, it does produce an output. This output is applied to one input of the AND element, to the other input of which is applied the positive check pulse from the proximity detector. When the two inputs coincide, the AND element produces an output, which is applied to the MEMORY element, the output of which operates the relay 59 to close the energizing circuit of the motor 25 and other associated circuits (not shown).

The operation of the system as applied to an automatic rotary press will now be described with reference to FIGS. 4 and 5. First, the variable resistor 53 is so adjusted to impress on the voltage comparator 48 a reference voltage $v$ corresponding to the diameter of the rolled sheet 13 to be detected. Then, when the press is being run, the sheet of paper is continuously drawn out of the roll, and the pulse generator 46 produces reference pulses $a$, which are applied to the stepped wave producing element 47, the output of which in turn charges the condenser 49. On the other hand, the proximity detector 44 produces one positive and one negative check pulse *b* for every one revolution of the rolled sheet 13. The negative check pulse causes the condenser to be discharged upon every one revolution of the rolled sheet. So long as the voltage level *e* attained by the condenser for each one revolution thereof is higher than the reference voltage level *v*, the voltage comparator produces no output, so that the AND element remains inoperative, even when it receives a positive check pulse from the proximity detector 44. However, as the diameter of the rolled sheet 13 decreases, with resulting increase in the rotational speed thereof, the time interval between each succeeding pairs of positive and negative check pulses becomes shorter and shorter, thereby accommodating fewer and fewer reference pulses *a* until the condenser voltage *e* cannot exceed the reference voltage level *v* any longer, whereupon the voltage comparator produces an output. This output is applied to the AND element 57 when a positive check pulse has been applied thereto from the proximity detector. Then, the AND element produces an output, which may be utilized to recognize that the rolled sheet has been consumed to the predetermined diameter. In other words, the diameter of the rolled sheet 13 to be detected has now been detected. The output of the AND element is applied through the MEMORY element 58 to the relay 59 to energize it. Upon energization, the relay closes the energizing circuit of the motor 25 and other associated circuits. The motor then turns the spiders 11 to the position where the new rolled sheet 14 is urged against the running sheet of paper still being drawn out of the old rolled sheet 13 so as to be frictionally rotated thereby. At this position, the head 12' on the spider arm 11' faces the proximity detector 44', and as the new rolled sheet 14 is rotated, the proximity detector produces pulses, one pulse for every one rotation of the rolled sheet. These pulses are counted by a pulse counter (not shown). It has been experimentally known that after twenty revolutions the rolled sheet attains the same speed as the running sheet 15. Therefore, when twenty pulses have been counted, the operation of connecting the outer end of the paper of the roll 14 to the running paper from the old roll 13 may be commenced. When the connection of the two sheets of paper has been completed, the spiders are further turned to position the new roll 14 where the old roll has been, with the head 12' now facing the proximity detector 44. Then, the previous operation will be repeated.

Having illustrated and described preferred embodiments of the invention, it should be noted that they are merely representative and that many modifications and changes may be made within the scope of the invention as defined in the appended claims.

What I claim is:

1. A system for detecting the diameter of a rolled sheet of a material being wound or unwound, comprising in combination with a rotatable shaft adapted to support said rolled sheet for rotation therewith: means for producing first pulses in response to the revolution of said shaft; means for producing second pulses at regular, constant interval, irrespective of variation of the rotational speed of said shaft; means for integrating said second pulses produced during the interval between each succeeding two of said first pulses and producing a voltage corresponding to the integrated voltage of said second pulses; means for providing a reference voltage; means for comparing said two voltages to produce a signal when said two voltages become equal, said first pulse producing means comprising a projecting member rigidly mounted on said shaft for rotation therewith and a proximity detector disposed adjacent to the rotational path of said projecting member and adapted to produce one pulse when said projecting member passes nearby said detector upon rotation of said shaft.

2. A system for detecting the diameter of a rolled sheet of a material being wound or unwound, comprising in combination with a rotatable shaft adapted to support said rolled sheet for rotation therewith: means for producing first pulses in response to the revolution of said shaft; means for producing second pulses at regular, constant interval, irrespective of variation of the rotational speed of said shaft; means for integrating said second pulses produced during the interval between each succeeding two of said first pulses and producing a voltage corresponding to the integrated voltage of said second pulses; means for providing a reference voltage; means for comparing said two voltages to produce a signal when said two voltages become equal, said second pulse producing means comprising a roller arranged to be in contact with the running sheet being wound into or drawn out of said rolled sheet so as to be frictionally rotated thereby, and a pulse generator associated with said roller to produce said second pulses, one for every one unit length of said running sheet.

3. A system for detecting the diameter of a rolled sheet of a material being wound or unwound, comprising in combination with a rotatable shaft adapted to support said rolled sheet for rotation therewith: means for producing first pulses in response to the revolution of said shaft; means for producing second pulses at regular, constant interval, irrespective of variation of the rotational speed of said shaft; means for integrating said second pulses produced during the interval between each succeeding two of said first pulses and producing a voltage corresponding to the integrated voltage of said second pulses; means for providing a reference voltage; means for comparing said two voltages to produce a signal when said two voltages become equal, said integrating means comprising a parallel combination of a condenser and a diode inserted between the output of said second pulse producing means and ground.

4. The system as defined in claim 1, wherein said reference voltage is variable.

5. A system for detecting the diameter of a rolled sheet of a material being wound or unwound, comprising in combination with a rotatable shaft adapted to support said rolled sheet for rotation therewith and means for rotatably supporting said shaft: a projecting member mounted on said shaft for rotation therewith; a proximity detector disposed adjacent to the rotational path of said projecting member for producing a pair of positive and negative check pulses when said projecting member passes nearby said detector; a pulse generator for producing reference pulses at regular and constant interval; an integrator including a condenser connected to the output of said reference pulse generator so as to be charged with said reference pulses produced in the interval between each succeeding pair of said negative check pulses, said condenser being connected to the output of said proximity detector through a discharge element so that said negative check pulse is applied to said condenser to discharge the same upon every one revolution of said rolled sheet; means for providing a variable reference voltage; a voltage comparator for comparing the charged voltage of said condenser and said reference voltage to produce a signal when said two voltages become equal; and an AND element having one input connected to the output of said voltage comparator and the other input connected to the output of said proximity detector so that said positive check pulses are applied to said AND element.

6. The system as defined in claim 5, wherein said proximity detector is provided separately of said shaft supporting means.

7. The system as defined in claim 5, wherein said proximity detector is attached to said shaft supporting means.

8. A system for detecting the diameter of a rolled sheet being wound or unwound, comprising in combination with a rotatable shaft adapted to support said rolled sheet for rotation therewith and means for supporting said shaft, including a housing for enclosing a portion of said shaft therein: a non-magnetic annular member rigidly mounted on said shaft within said housing; a permanent magnet of a U-shape having outwardly projecting poles of opposite polarities and rigidly mounted on said non-magnetic member for rotation with said shaft; a pair of magnetically permeable members mounted on said housing; a proximity detector arranged separately of said housing means and adjacent to said permeable members for detecting said permanent magnet passing by said permeable members upon rotation of said shaft so as to produce a pair of one positive and one negative pulse; a roller adapted to be borne against said sheet being wound into or drawn out of said rolled sheet; a pulse generator associated with said roller for producing measuring pulses, one pulse for every one unit length of said running sheet; an integrator including a condenser connected to the output of said reference pulse generator so as to be charged with said reference pulses produced in the interval between each succeeding pair of said negative check pulses, said condenser being connected to the output of said proximity detector through a diode so that said negative check pulses is applied to said condenser to discharge the same upon every one revolution of said rolled sheet; means for providing a variable reference voltage; a voltage comparator for comparing the charged voltage of said condenser and said reference voltage to produce a signal when said two voltages become equal; and an AND element having one input connected to the output of said voltage comparator and the other input connected to the output of said proximity detector so that said positive check pulses are applied to said AND element.

References Cited

UNITED STATES PATENTS 2,939,646    6/1960    Stone    242—58.2
3,208,683    9/1965    Thompson    242—57

LEONARD D. CHRISTIAN, *Primary Examiner.*